United States Patent Office 3,190,185
Patented June 22, 1965

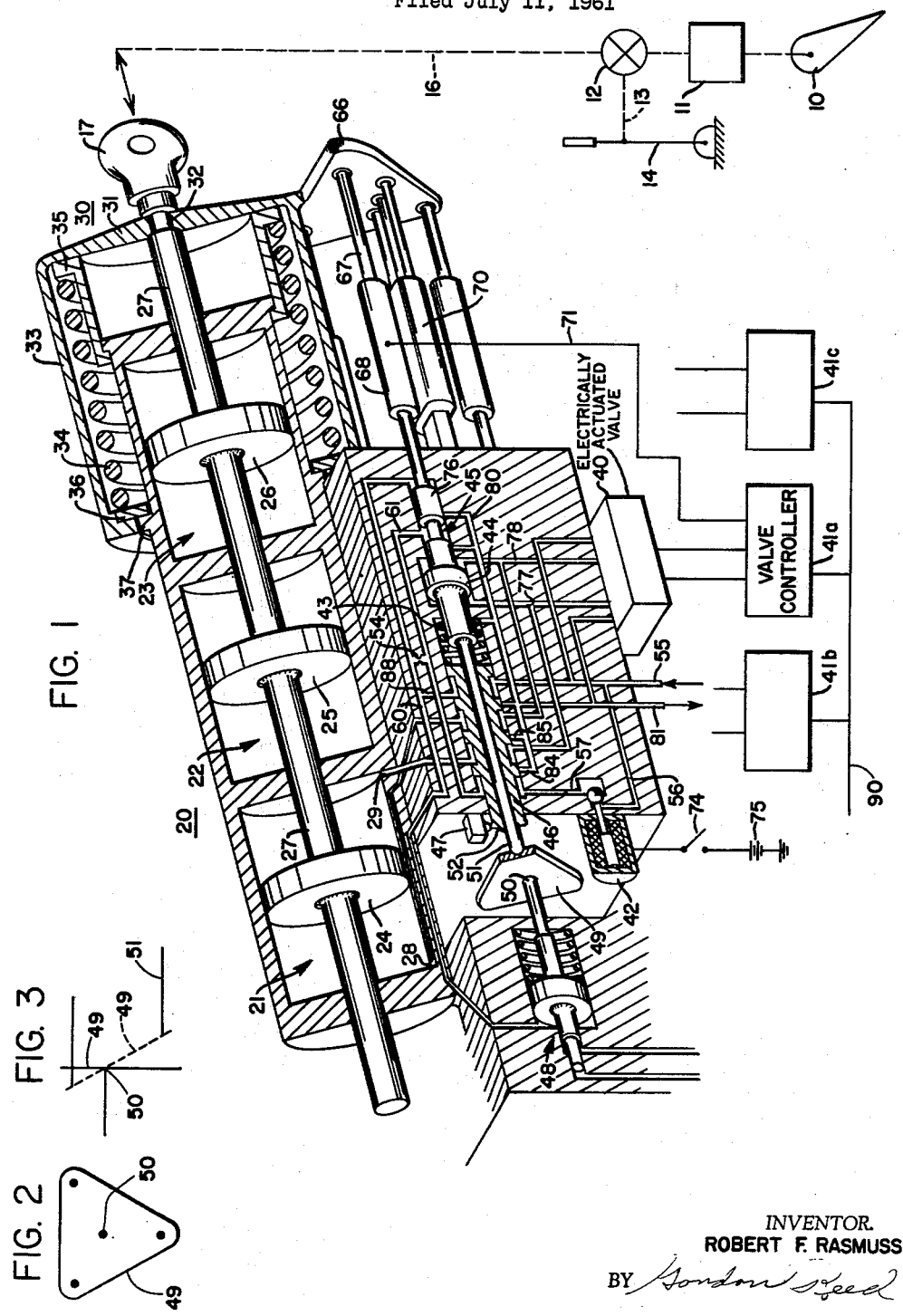

3,190,185
SERVOMOTOR WITH MONITOR
Robert F. Rasmussen, Brooklyn Center, Minn., assignor to Honeywell Inc., a corporation of Delaware
Filed July 11, 1961, Ser. No. 123,220
21 Claims. (Cl. 91—363)

This invention relates to a servomotor with monitor and more particularly to a servomotor with monitor of the redundant type. This invention in further particulars is an improvement in servomotor with monitor of the type disclosed in a prior application of Roger D. Borgeson and Robert F. Rasmussen, Serial No. 79,950, filed December 30, 1960, now Patent No. 3,142,042. In said application a dual tandem servomotor having redundant features was disengaged upon a malfunction occurring.

In the present arrangement a triple rather than dual tandem servomotor which drives an output member is provided, wherein a triple channel augmentation system feeds three independent electrical signals of the same type to electro-hydraulic transfer valves each valve controlling one of said tandem servomotors. The improvement provided in this triple tandem servomotor over the prior dual arrangement is that the operation of the three tandem sections are compared, and if there is a significant difference in the control between one particular servo and the remaining two, that one particular servo will be hydraulically disengaged.

The remaining two tandem servos however remain operative. But should there subsequently be a significant difference between the operation of the remaining two servomotors, then the entire triple tandem servomotor is rendered ineffective or inoperative to position its output member.

Further objects of the invention will be obtained upon consideration of the following specification taken in conjunction with the accompanying drawing wherein:

FIGURE 1 shows a preferred arrangement of the invention;
FIGURE 2 shows a portion of FIGURE 1 relating to a tiltable plate;
FIGURE 3 shows the tiltable plate in a side view and illustrates in tilted position the relative displacements of malfunctioning compared with displacement of proper functioning comparator members.

Considering the servomotor as a power means having a mechanical output, the servo cylinder thereof translates electrical signals into hydraulically powered motion of the mechanical system such as the operating system for the control surfaces of an aircraft. The operation of the servo cylinder in the present embodiment is in series with the operation of the control stick of an aircraft whereby each may operate independently of the other. When used, the servo cylinder is energized or powered from three separate electrical systems and one or more hydraulic pressure supply systems. Upon failure of the hydraulic pressure system when one pressure supply is used, the servo cylinder may be automatically shifted to a second source of power.

Concerning the redundant or monitoring features of the apparatus, command signals from a triple channel stability augmentation system of an aircraft wherein each channel has the same signal are fed through individual signal bridges into three independent electrohydraulic valve operating means for its respective transfer valve. The operation of each transfer valve simultaneously (1) ports hydraulic fluid to its particular section of the triple tandem servo, causing it to move to the commanded position, and (2) ports hydraulic fluid to its respective comparator cylinder. There are thus three such comparator cylinders one for each section of the tandem servomotor.

Continuing with the monitoring features, the comparator cylinders are mechanized to provide an integration on the algebraic sum of three cylinder differential pressures that is one for each of the three cylinder sections of the servo. Limits are placed on the integration measured in terms of displacement of members so that automatic hydraulic disengagement will occur in one of the three independent systems only when there is a significant difference in the commands to the tandem rams for an appreciable length of time. The system which will be hydraulically disengaged will be the one that disagrees wtih the other one. The remaining two comparators and their respective rams remain hydraulically energized and execute the servo-cylinder functions with full displacement authority on the control surface of the craft as long as pressures to the two comparators remaining agree. The integration limits still apply and complete automatic hydraulic disengagement will occur only when there is a significant difference in the remaining two commands to the tandem ram. The disengaged output member or shaft is returned to neutral position and restrained there upon complete hydraulic disengagement.

A servo cylinder may be re-engaged for single channel operation, provided that one channel remains which is sufficiently balanced.

The comparator cylinders also perform the function of bridge balancing within the disengage limits and allows re-engagement of the servo cylinder only if safe operation is possible.

Referring to the drawing, a condition controlling device such as an attitude changing means or control surface 10 of an aircraft is differentially positioned through what may be termed a series motor 20 through operating means 11 from a differential arrangement 12. There are two inputs to this differential 12, one comprising an operating means 13 positioned by a conventional control stick 14 of an aircraft and the other from an output shaft 16 of an electro controlled-fluid operated servo arrangement 20. The servo arrangement 20 comprises triple tandem sections 21, 22 and 23 having respective rams or pistons 24, 25, 26 carried on a common output shaft or piston rod 27. Rod 27 has an undercut portion 32 receiving end 31 of a cuplike cylindrical member 30. Any suitable means may be provided for holding the end 31 and rod 27 in an integral manner for operation together. The cylindrical member 30 includes the cylindrical wall 32 extending longitudinally of rod 27. A return or centering spring 34 is placed within the inner wall of cylindrical wall 32 and one end thereof engages a shoulder 35 of a fixed end of the servo arrangement 20 and the opposite end engages a further shoulder member 36 on the cylindrical portion 32. In normal or centered position, the shoulder member 36 engages a further shoulder 37 on the fixed portion of servo arrangement 20.

Each of the individual rams 24, 25, 26 is provided with a separate fluid transfer valve. Each transfer valve in turn is controlled by unbalance in a balanceable electrical system comprising a balanceable network. The network unbalance may be effected in any desired manner as by a condition sensing device which may be a craft attitude sensing device and such unbalance of the network results in displacement of the transfer valve. A rebalancing arrangement for each separate network is provided in a manner to be described.

To facilitate the illustration and understanding of the invention, the details of but one monitoring arrangement for one of the sections 21, 22, 23 will be described, but it is to be understood that three such monitoring arrangements are provided. The particular monitoring arrangement to be described is associated with servo section 21.

Section 21 comprises a typical transfer valve 40 comprising a servo control valve which may be of the three land type which type of valve is old in Patents 2,679,138, 2,517,150, or 2,952,424 and an electrical actuator therefor. The electrical actuator is energized from a valve controller 41a. Such a valve controller develops an output voltage to energize the valve actuator to move the valve in one direction or another from a normal position in response to unbalance in a network. Such network may be of the rebalance type and well known in the art. Section 21 additionally comprises an electrically operated normally closed momentarily open pilot valve 42 which is of the solenoid type. There is additionally included a comparator comprising an elongated rod supporting a ram 44. The rod supports an operable portion of a limit valve 45 near one end and also includes an actuator for a rebalancing or follow-up signal generator 68 which may be of the transformer type. Also included or associated with the rod is an "engage" indicator switch 47. Switch 47 is moved to operated position, shown, upon energization of pilot valve 42, by an end 52 of an engage valve 46 normally spring biased to unoperated position at which time the engage switch is unoperated. A comparison or monitor device for disengaging a malfunctioning servo section is provided for monitoring the operation of the three sections 21, 22, 23 by comparing the differential pressures on rams 24, 25, 26. The monitor includes a ram 48 having three sections of various diameters. The ram 48 has a rod extension having an end 50. Upon application of hydraulic pressure to the ram 48 of the monitor it projects rightwardly in FIGURE 1, while opposed by a return spring, against a triangular like tiltable sensing plate 49 carried by a ball joint on end 50. The opposite side of plate 49 may be engaged by three rod extensions represented by extension 51 of the rod on which ram 44 is mounted, in a manner to be described. Plate 49 is equilateral in shape, and has the pivotal point 50 at its center. A rod extension engages the plate near the apex of each angle. It is evident from FIGURE 3 that when plate 49 is tilted about an axis equidistant from two engaged points on the plate due say to a differential pressure on one ram unlike that on the other two rams, the one rod is displaced a distance different than the other two. The other two rods are displaced equal distances.

Operation

The operation of the arrangement and the relationship between the various ports and cutout portions of engage valve 46 and limit valve 45 may be more clearly appreciated from a description of the operation in connection with FIGURE 1. Beginning with pressure applied to conduit 55 such pressure is transmitted through a subconduit 56 to the chamber of pilot valve 42. For the arrangement as shown of engage valve 46, valve 42 had already been operated. Such operation had transmitted pressure through the opened valve 42 and conduit 57 to one land on the left end of engage valve 46 moving it rightwardly against the resistance of a return spring 43 which engages the right end of valve 46.

Such displacement of engage valve 46 permits pressure to pass from conduit 55 around operated valve 46 and subconduit 88 to a conduit 60 which supplies pressure to ram 48. Additionally pressure from conduit 60 is supplied to the right end of limit valve 45 causing end 51 of the rod to engage triangular plate 49 which had now moved rightwardly under the application of pressure to the respective hold circuits for various diameter sections of piston 48. Pressure from conduit 60 is also supplied through an orifice 54 to a conduit 61 which maintains pressure on the left end of engage valve 46 to keep it rightwardly displaced from its unoperated position when valve 42 is deenergized. Conduit 61 supplies pressure also to the comparator limit valve 45 which as shown is in the closed position. If valve 45 moves to the left or right, conduit 61 is connected through conduit 80 to return conduit 81 for the purpose to be described.

Integral with the limit valve 45 and operable therewith is a portion of a follow-up signal generator 68 having its coacting part 67 carried by a lateral extension 66 of the base 31 of the cup member 30. The follow-up signal may be generated by a potentiometer type pickoff but herein is shown as a transformer with the energization therefor being supplied by dual transformer 70. The output of the feedback signal generator is supplied over conductor 71 to the valve controller 41a to rebalance the network therein. Each valve controller may be unbalanced by further means 90 which normally duplicates the unbalance to each valve controller. Unbalance of valve controller 41a in one direction moves valve 40 in one direction to connect pressure conduit 55 to conduit 78 and from thence apply pressure in parallel to the right end of valve 44 and through engage valve 46 and a suitable conduit to the left side of piston 24. Meanwhile the right side of piston 24 is connected through a suitable conduit, another section of valve 46, conduit 77, to return conduit 81. If the valve 40 is moved in the opposite direction, it will be evident from FIGURE 1 that pressure line 55 is connected to conduit 77 and pressure from thence is applied in parallel to the left side of ram 44 and right side of ram 24, meanwhile the left side of ram 24 and right side of ram 44 are connected to return 81.

Each of the three sections may be "engaged" or placed in controlling condition by momentarily energizing the respective pilot valves as valve 42. This action is obtained by closing a single pole single throw switch 74 which completes a circuit from a battery 75 to valve 42 energizing the latter, at least momentarily, after which switch 74 may be reopened. During normal three-channel-engage operation the comparator rams, as ram 44, are mechanically coupled by means of hydraulic loads applied for example at the right end 76 of ram 44 against a summing plate 49 at three equidistant points shown which are equidistant from each other and from the summing plate pivot formed by end 50 of ram 48. This summing plate pivot extended position is fixed by the hold circuit piston 48.

Monitoring action

If the differential pressure in one section, as 21, which may be determined or obtained in conduits 77, 78 which are the supply and return conduits connected to oppose sides of ram 44 for example, is different from that in sections 22, 23 the comparator summing plate 49 will tilt at a rate proportional to the amount of misphase or error in differential pressure. The tilting is derived from the application of the differential pressure to opposed sides of ram 44. The tilting of plate 49 will indicate the two in-phase transformer references or follow-up signal generators such as generator 68 moving equally in a direction opposite that of the transformer reference associated with the out-of-phase signal. The electrical feedback signals of these transformers are proportional to both the output determined by displacement of output shaft 16 and the comparator ram motions. The respective feedback signals from the transformer references to their valve controllers will result in repositioning of the servo valve resulting in the output shaft 16 moving to a position proportional to the average of the three command signals. These command signals as noted may be supplied from sensing devices or from a manual source of signal in the various valve controllers.

If the differential pressure in one cylinder measured as stated in conduits 77, 78 for example is excessively different from the differential pressure from the other two cylinders and such difference is prolonged, the comparator ram of that one cylinder will travel a greater distance as evident from FIGURE 3 than the remaining two rams and this distance is sufficient to port the engage hold pilot pressure in conduit 61 for example through the limit valve 45 to return conduits 80, 81. However, the displacement of the other comparator rams is insufficient to open their respective limit valves. With the drop in pressure in conduit 61, by connecting it to return 80, the pressure on the left end of engage valve 46 decreases whereby the return spring moves the engage valve 46 leftward until end 52 of the valve engages the triangular plate 49. Thus the engage valve 46 (but not the hold circuit piston 48) transfers to the disengaged position. Such transfer causes the opposed sides of piston 24 to be in communication with each other through now unblocked return conduits 84, 85 thereby deactivating or hydraulically disengaging section 21 of the triple tandem servomotor arrangement 20.

The abutting of end 52 of engage valve 46 with summing plate 49 restricts the freedom of subsequent movement of the summing plate to one plane. The output shaft 16 thereafter moves to a position proportional to the average of the command signals on the remaining sections 22, 23 of the triple tandem servo arrangement. If the differential pressures in the remaining sections 22, 23 are the same, their respective comparator rams corresponding with ram 44 of section 21 will exert equal pressures on the summing plate 49 and no tilting thereof will occur.

However, if a differential pressure on the respective rams 25, 26 be different and be of considerable duration of time, there will be a greater prolonged pressure on one comparator ram than on the other thus causing the summing plate 49 to tilt. It is evident that such tilting will cause the movement of one ram and its limit valve in one direction to cause loss of engage pressure on its respective engage valve whereas the opposite direction of displacement of the other comparator ram will also cause opposite displacement of its limit valve which nevertheless as shown by the construction place the engage pressure line such as conduit 61 in communication with the return thus similarly causing loss in the engage pressure on its engage valve and movement thereof toward left. Thus this disagreement of the two remaining commands for a considerable duration will cause complete hydraulic disengagement of the servo ram arrangement 20.

Thus it will be understood that short period or transient occurrences of differences in the differential pressures on the respective rams 24, 25, 26 will be reflected in only slight displacement of the comparator rams thus resulting in feedback signals from feedback signal generators as generator 68 causing repositioning of the transfer valves as valve 40 in section 21 until the pressures in these three sections are equal.

However, if the difference in differential pressure extends over a period of time sufficient for passage of significant volume of fluid into the ram 44 for example resulting in an integration effect, the ram will be moved a sufficient distance to port the engage pressure through valve 45 to the return as by placing conduit 61 in communication with conduit 80 resulting in hydraulic disengagement of the particular section involved. Such prolonged existence of the difference in differential pressure may be caused by a malfunction such as stoppage in conduit 77 and not in 78, for example, or for other similar causes.

Disengaged condition

In the disengaged condition, the output shaft 16 is centered and held therein by preloaded spring 34. The engage valves are in their leftward positions and thus the tandem ram ports such as ports 28, 29 of section 21 are connected to return 81 through engage valve 46 and conduits 85, 84, and they are also shut off from their respective transfer valves. The pilot valves, as valve 42, are deenergized with the engage valves, such as valve 46, as stated porting the pilot pressure lines as line 61 to return conduit 80 for example. This allows the engage valves and the hold circuit piston 48 to be held in the disengaged position by their associated springs.

In the disengaged condition of the servo arrangement 20, the operation of a transfer, as valve 40 by unbalance of controller 41a, causes the operation of its associated ram 44 thus positioning the unrestrained comparator ram 44 and feedback transformer portion 68 to balance its network and its respective valve controller.

The comparator limit valves, such as limit valve 45, will allow reengagement of its associated output ram such as ram 24 if one or more of the comparator servo loops are already nulled to the centered position. If a comparator servo loop is not nulled to the centered position, the comparator ram is displaced from center due to a displacement of the transfer valve because of the out-of-null condition of its associated network. In other words if a transfer valve be displaced a comparator ram will have a differential pressure thereon resulting in displacement of the comparator ram whereby the limit valve as valve 45 will place conduit 61 for example in communication with return 80 whereby any operation of the pilot valve 42 would not result in application of pressure to the left end of engage valve 46 to move it rightwardly from its disengaged position.

Operation to engage

All of the three control switches for the pilot valves, as switch 74 of valve 42, may be under control of a single normally opened momentarily closed button type switch the operation or closing of which applies a D.C. pulse to the three pilot valves simultaneously to open the valves.

These pilot valves in turn apply pressure through suitable fluid conducting passages as conduits 57 to the left end of the engage valves and on displacement of the engage valves pressure is applied as from pressure conduit 55, valve 46, conduits 88, 60 to the right end of their respective comparator members as end 76 as well as through orifices such as orifice 54 and conduit 61 to the left end of valve 46. This pressure is sufficient to move the ram engage valves as valve 46 to the engage position when the respective comparator rams as ram 44 are centered. Thus in the engaged position, pressure is supplied, through the operated engage valve 46, to (1) the piston 48 and transfer it to the engage position, (2) the piston areas, as at end 76, to the right of the limit valves, as limit valve 45, which are force balanced through the summing plate 49, and (3) supply pressure through orifices, as 54, to hold the engage valve 46 in the engaged position following closing of the pilot valve 42. Engagement of each system is indicated by means such as indicator 47 actuated by portion 52 on the engage valve 46. The orifices mentioned are illustrated by orifice 54 in section 21 intermediate conduits 60, 61. Until control valve 40 is operated, valve ports 28, 29 are isolated from pressure line 55 and return 81.

One purpose of orifice 54 is to restrict fluid flow from conduit 61 to conduit 60 and hence through subconduit 88 and return conduit 81 so that upon initial engagement, the fluid pressure applied through pilot valve 42 permits the pressure in conduit 57 to actually move engage valve 46. In the absence of the orifice 54, and with the engage valve 46 in the unoperated position to the left from the that shown, it is evident that conduit 61 is connected to conduit 60 and subconduit 88 and without a restriction would port pressure to return line 81 preventing actual displacement of the engage valve 46. The connection between conduits 60, 61 including orifice 54 is nevertheless required to maintain pressure on the left end of the engage valve 46 after it has been moved to the engage position should valve 42 be closed.

It has been stated that after the triple tandem arrangement 20 had been disengaged by successive malfunctioning of a first and thereafter a second section thereof, that a single section could be re-engaged if one or more of the comparator servo loops had been nulled to the centered position. Such single section develops enough force to overpower the servomotor centering spring 34 and through the output shaft 16 and differential 12 positions the control valve of the main surface actuator 11.

The purpose in disengaging or rendering inoperative the entire servo arrangement 20 upon the presence of significant differences in differential pressure in the remaining two commands to the tandem ram following the hydraulic disengagement of one section is due to the fact that it is not known which of such remaining two sections is malfunctioning and therefore which should be retained. It has been deemed advisable to disengage the whole servo arrangement and reengage the proper functioning ram. The selection of the proper section to engage is made by the pilot.

It will now be evident from the above that there has been provided a novel redundant fluid type servomechanism that may be selectively engaged with condition changing means such as a control surface of an aircraft and which servomechanism comprises three sections which may be individually engaged and which may simultaneously apply a joint effect on the mechanism output member and wherein a malfunction of one section operatively or hydraulically disengages the malfunctioning section while retaining the operativeness of the two remaining sections. Upon subsequent malfunctioning of either of the remaining two sections, the entire servomechanism is disengaged from the control surface and centered. However, thereafter the one of such two remaining sections that is not malfunctioning may be separately re-engaged to continue automatic control of the control surface. From the above arrangement and with the servomechanism in an aircraft, the disengagement of any section gives intelligence to the pilot of the aircraft through the unoperated position of its indicator switch by noting indicator 47 is off that he should be prepared to apply manual control through control stick 14 in the event that another malfunction occurs reflected in moving of a second indicator switch to unoperated position so that in the event the aircraft is in an instability portion of its flight regime required manual control is instantly available.

Although the present invention has been described with a certain degree of particularity, it is understood that various modifications in the details and arrangements of parts may be had without departing from the spirit and scope of the invention as hereinafter claimed.

What is claimed is:

1. In a fluid type servomechanism having an output member and comprising at least three cylinders and integrally connected rams, one for each cylinder, connected also to said output member; a servo control valve for each cylinder; an engage valve intermediate each said servo valve and cylinder to effect transmission of fluid from the servo valve when operated to its respective cylinder; pressure responsive means connected to each engage valve for operating each said engage valve to its operated position; a comparator or limit valve for each cylinder; means for operating or displacing each limit valve in response to differential pressures on opposite sides of the ram in each individual cylinder; and means responsive to unequal differential pressures in the three cylinders operating one of said limit valves to relieve the pressure on the engage valve and causing return of said one engage valve to unoperated position whereby the opposed ends of the cylinder corresponding to said returned engage valve because of a malfunction, indicated by nonconformance of its differential pressure with the other two cylinders, are brought into communication with each other.

2. In an electro controlled-fluid operated type servomotor comprising three cylinders connected in tandem relation by having their rams or pistons connected to a common ouput shaft with an individual servo control valve for each ram and further means for operating each servo valve, in combination: three balanceable valve position controllers, one individual to each further means; means duplicating unbalance in each balanceable valve position controller; a servo fluid pressure monitor; a follow-up means for each balanceable valve position controller and operatively connected to the monitor, each follow-up means responsive to differential pressure on a ram and movement of said output shaft; and means connecting each follow-up means to its balanceable valve position controller to effect unbalance thereof by the monitor when a differential pressure is applied to one ram unlike that to the other two rams to effect repositioning of the control valve for the ram having the unlike differential pressure, for rendering such malfunctioning ram ineffective on said common output shaft.

3. The apparatus of claim 2, and further means in said monitor operated in response to a prolonged difference in differential pressure on said ram with respect to the other two for disengaging hydraulically said one ram and cylinder from said output shaft.

4. In a combined triple type fluid servomotor having three sections jointly operating an output member, sensing means for monitoring the differential fluid pressures applied to all of said servomotors, adjusting means responsive to transient differences in the three differential pressures for equalizing the three differential pressures, and further means responsive to prolonged existence of said differential pressures difference rendering one of the triple servomotors inoperative on said output member.

5. The apparatus of claim 4, means including said sensing means monitoring solely the two differential fluid pressures in the remaining two servomotors and additional means responsive to prolonged existence of a difference in said two differential pressures operatively disconnecting said two servomotors from the output member.

6. The apparatus of claim 5, and means for thereafter rendering one of the three servomotors operative on said output member.

7. In control apparatus for controlling a condition, said apparatus having condition changing means, a triple type fluid servomotor having an output member positioning said condition changing means, said servomotor comprising three sections jointly operating said output member, a separate control valve for each section, a separate balanceable valve controller positioning each servo valve, a further means jointly responsive to the differential pressure applied to each servo section, follow-up means positioned in accordance with the displacement of said output member and the displacement of the further means; and means connecting said follow-up means to each valve controller whereby the displacement of the output member is in accordance with the average of the three feedback signals.

8. A servomotor comprising an output member and three ram and cylinder type servos jointly positioning said output member, and each servo having the following unshared elements namely a servo valve, a balanceable means operating said servo control valve, a two part follow-up device for the balanceable means, means positioning each follow-up device from the output member and a further means responsive to the differential pressure on the ram of the respective servo; an operable summing or comparing device; means connecting said summing device and the three further means so that if one servo cylinder differential pressure is different slightly from that of the other two the summing device will reposition the follow-up of the dissimilar differential pressure servo to cause a signal from the follow-up device of its similar servo to alter the servo valve position thereof to cause the servo differential pressure of said dissimilar servo to equal that of the other two.

9. The apparatus of claim 8; an unshared engage valve for each servo between its control valve and ram cylinder; and additional means operating said engage valve to disengage position to interrupt control of said ram cylinder by the control valve upon excessive prolonged dissimilarity in differential pressure in said one servo.

10. The apparatus of claim 7 and additional means responsive to prolonged time existence of a difference in the three differential pressures obtained from said three sections for operatively disengaging one section from the output member.

11. A servomotor comprising an output member and three independent servos each comprising a ram and cylinder and an independent transfer valve for each servo applying differential pressure to its ram; means normally operating each transfer valve equally; an independent comparator for each servo operated by the transfer valve in parallel with each servo ram; and means associated with each comparator and operated thereby for hydraulically disengaging one of said three servos upon excess dissimilarity in differential pressure on its ram with respect to that of the differential pressure applied to the other two servo rams.

12. The apparatus of claim 11 characterized by the three servomotors being arranged in tandem relationship and connected to said output member.

13. The apparatus of claim 12; and biasing means operating on said output member to center the servo rams with respect to their cylinders upon removal of control pressure to the servo control valves.

14. For controlling a hydraulic positioning servo comprising a transfer valve, a control circuit connected to said transfer valve for movement thereof responsive to signals supplied from said circuit, said hydraulic positioning servo including a piston and cylinder connected for relative displacement in response to movement of said transfer valve, spring actuated means connected to center and lock said piston with respect to said cylinder upon loss of hydraulic pressure, an engage valve between said transfer valve and servo and responsive to hydraulic pressure, connecting said transfer valve and motor, said engage valve being biased to unoperated position upon loss in fluid pressure to interconnect both sides of said piston thereby to permit centering of said piston within the cylinder by said spring actuated means.

15. An elecrtically operated fluid operated first positioning servo comprising a servo control valve, electric signal providing apparatus connected to said servo control valve for operation thereof, a fluid operated second positioning servo including a piston and cylinder, an engage valve intermediate said servo control valve and first positioning servo and biased to an unoperated position wherein said first positioning servo is disconnected from said servo control valve and moved to an operated position in response to fluid pressure to place said first positioning servo in communication with said servo valves, further means including said second positioning servo responsive to differential pressures on the output side of said servo valve and effective on prolonged duration of said differential pressure removing the hydraulic pressure on said engage valve.

16. The apparatus of claim 15, and follow-up means responsive to relative position of said further means and first positioning servo for the balancing said signal providing apparatus.

17. A redundant servomotor system having three output member portions, one output member portion comprising a portion of a first closed loop servomechanism, a second output member portion comprising a portion of a second closed loop servomechanism, a third output member portion comprising a portion of a third closed loop servo-mechanism, a first means in said first servomechanism initiating operation of said first servomechanism, a second means in said second servomechanism initiating operation of said second servomechanism, a third means in said third servomechanism initiating operation of said third servomechanism, first feedback means operated in part by said first output member portion terminating the operation of said first output member portion, second feedback means operated in part by said second output member portion terminating the operation of said second output member portion, third feedback means operated in part by said third output member portion terminating the operation of said third output member portion, and a comparator means connected to the above three feedback means for complementary operation of said three feedback means, said comparator means being responsive to three separate forces related to the three output member portions, each force being indicative of the force supplied by its corresponding output member portion, said comparator means being effective when one of said three forces differs over a time period from that of the other two, terminating operation of said corresponding servomechanism.

18. A triple redundant fluid operated type servo system having three sub-channels operating corresponding outputs in accordance with a common demand signal, the outputs being required to be in substantial agreement, each sub-channel comprising an actuator control means to which a signal representing the common demand quantity is applied, an individual actuator for each actuator control means having an ouptut member movement which represents the output of the sub-channel, each actuator control means being responsive to a resultant signal representing the common demand quantity and the position of the output members, and means responsive to three fluid pressures, each pressure indicative of the force of its corresponding output modifying the resultant signal upon one of said three fluid pressures being unlike the other two.

19. An apparatus for displacing a control surface of an aircraft or the like in response to a command signal, comprising at least three independent closed loop, fluid operated, ram type servo control systems, each having its output mechanically coupled to a common member for positioning said surface, each servo control system having an independent control valve means adapted to be supplied with an electrical signal from input control means, an engage valve for each servo transmitting fluid to the servo from the valve means when in operated position, means for sampling the operating condition of each control valve means, and comparing means responsive to said last named means and effective upon difference in condition of a one control valve means relative to the other two, moving the related engage valve to unoperated position terminating operation of said one servo control system.

20. Apparatus for controlling the movement of an aircraft control surface, comprising at least three fluid operated servo control systems with their outputs connected to a common output member controlling movement of said surface and each having an independent electrical signal transmission channel each adapted to be supplied with an input signal, monitoring means responsive to the relative operating fluid pressure condition of the outputs of all said servo control systems and rendering one servo control system ineffective to operate the common output member when the operating condition thereof differs from that of the other servo control systems.

21. Apparatus for controlling an output member comprising: at least three fluid operated, tandem ram type servo control systems having their rams jointly operating said output member, each servo control system having an independent electrical transmission channel adapted to control a valve for controlling its respective ram; and monitoring means responsive jointly to the fluid pressures on opposite sides of the three rams, rendering one ram ineffective to position the output member when its pressures differ from that of the other two ram pressures.

References Cited by the Examiner

UNITED STATES PATENTS

| | | | |
|---|---|---|---|
| 2,898,889 | 8/59 | Foster | 121—41 |
| 2,916,205 | 12/59 | Litz | 121—38 |
| 2,921,562 | 1/60 | Westburg et al. | 121—41 |
| 2,939,653 | 6/60 | Rasmussen et al. | 121—41 |
| 2,947,285 | 8/60 | Baltus et al. | 121—38 |
| 3,015,313 | 1/62 | Faisandier | 121—41 |
| 3,095,783 | 7/63 | Flindt | 91—363 |
| 3,095,784 | 7/63 | Colhoun | 91—363 |

FRED E. ENGELTHALER, *Primary Examiner.*

KARL J. ALBRECHT, SAMUEL LEVINE, *Examiners.*